US011425280B1

(12) United States Patent
Morales et al.

(10) Patent No.: US 11,425,280 B1
(45) Date of Patent: *Aug. 23, 2022

(54) METHODS AND PRINTING SYSTEM FOR MULTI-TIER COLOR MANAGEMENT

(71) Applicant: Kyocera Document Solutions Inc., Osaka (JP)

(72) Inventors: Javier A. Morales, Rochester, NY (US); Michael M. Chang, El Segundo, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,487

(22) Filed: May 5, 2021

Related U.S. Application Data

(63) Continuation-in-part of application No. 17/209,363, filed on Mar. 23, 2021.

(51) Int. Cl.
  *H04N 1/60* (2006.01)
  *G06K 15/12* (2006.01)
  *G06K 15/02* (2006.01)

(52) U.S. Cl.
  CPC .......... *H04N 1/605* (2013.01); *G06K 15/129* (2013.01); *G06K 15/1802* (2013.01); *H04N 1/6097* (2013.01)

(58) Field of Classification Search
  CPC .... H04N 1/605; H04N 1/6097; G06K 15/129; G06K 15/1802
  See application file for complete search history.

(56) References Cited

U.S. PATENT DOCUMENTS

| 5,774,146 A | * | 6/1998 | Mizutani | B41J 2/21 347/15 |
| 9,019,561 B1 | * | 4/2015 | Sanchez | G06K 15/1881 358/1.9 |
| 11,218,618 B1 | * | 1/2022 | Morales | H04N 1/6033 |

(Continued)

FOREIGN PATENT DOCUMENTS

| JP | 2006-186416 A | | 7/2006 |
| JP | 2006186416 A | * | 7/2006 |

OTHER PUBLICATIONS

English Abstract for JP2006186416, Publication Date: Jul. 13, 2006.

*Primary Examiner* — Ted W Barnes
(74) *Attorney, Agent, or Firm* — Millen, White, Zelano & Branigan, P.C.; William Nixon

(57) ABSTRACT

A color printing system uses color printing management tiers to control color printing resources at a printing device. The color printing management tiers include a media type color management tier, an ink limited calibration tier, and a calibration and ICC profile creation tier. A print job includes a parameter that is used to select the management tier for color conversion operations for the print job. The parameter can include an attribute or a media type for the print job. The applicable tone reproduction curve (TRC) or ICC profile is retrieved according to the selected management tier. The TRC or ICC profile is adjusted according to an input applicable to the respective management tier. The TRC or ICC profile also is selected from a plurality of TRCs or ICC profiles, respectively.

15 Claims, 13 Drawing Sheets

(56) References Cited

U.S. PATENT DOCUMENTS

| | | | | |
|---|---|---|---|---|
| 2002/0083852 A1* | 7/2002 | Degani | ............... | H04N 1/6097 101/171 |
| 2002/0085233 A1* | 7/2002 | Degani | ............... | H04N 1/407 358/3.1 |
| 2005/0094170 A1* | 5/2005 | Ichitani | ............... | H04N 1/6033 358/1.9 |
| 2006/0152776 A1* | 7/2006 | Bailey | ............... | H04N 1/6055 358/504 |
| 2006/0262360 A1* | 11/2006 | Dalrymple | ............ | H04N 1/6033 358/518 |
| 2007/0291291 A1* | 12/2007 | Vilar | ............... | H04N 1/3878 358/1.9 |
| 2008/0259362 A1* | 10/2008 | Horn | ............... | H04N 1/40012 358/1.9 |
| 2010/0149559 A1* | 6/2010 | Morales | ............... | H04N 1/6097 358/1.9 |
| 2010/0150438 A1* | 6/2010 | Farrell | ............... | H04N 1/6033 382/167 |
| 2011/0013210 A1* | 1/2011 | Yamaguchi | ............ | H04N 1/6097 358/1.9 |
| 2012/0086959 A1* | 4/2012 | Wu | ............... | H04N 1/6022 358/1.9 |
| 2012/0188565 A1* | 7/2012 | Schweid | ............... | H04N 1/401 358/1.9 |
| 2012/0188596 A1* | 7/2012 | Niles | ............... | G06F 3/1229 358/1.15 |
| 2013/0107291 A1* | 5/2013 | Kuehn | ............... | H04N 1/6036 358/1.9 |
| 2014/0168712 A1* | 6/2014 | Smith | ............... | H04N 1/603 358/3.23 |
| 2014/0268194 A1* | 9/2014 | Pugh | ............... | G06K 15/1878 358/1.9 |
| 2017/0171432 A1* | 6/2017 | Qiao | ............... | H04N 1/6008 |
| 2017/0374234 A1* | 12/2017 | Leskanic | ............ | H04N 1/6041 |
| 2018/0189617 A1* | 7/2018 | Feng | ............... | G06K 15/16 |
| 2019/0068840 A1* | 2/2019 | Fujino | ............... | H04N 1/6038 |

\* cited by examiner

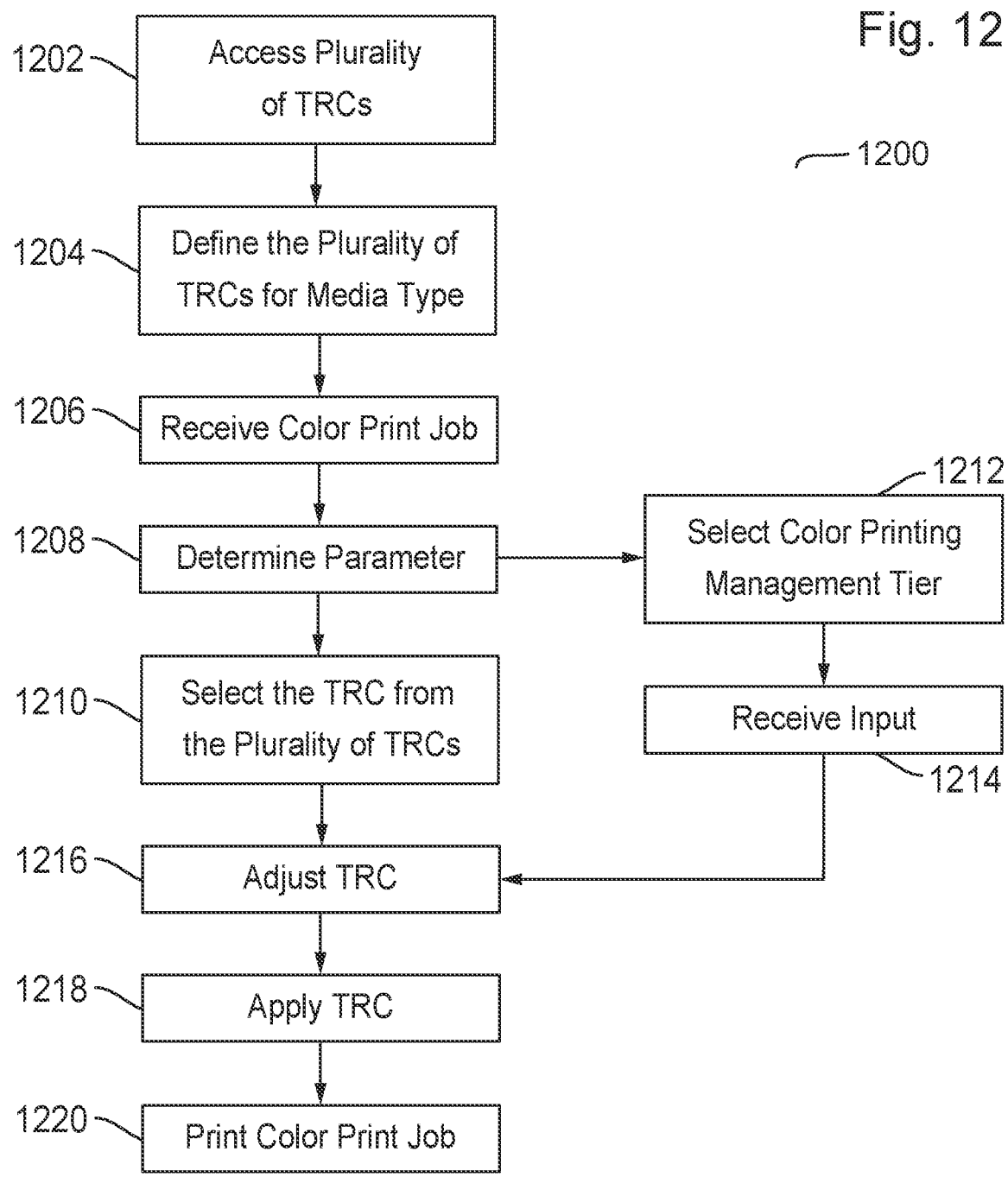

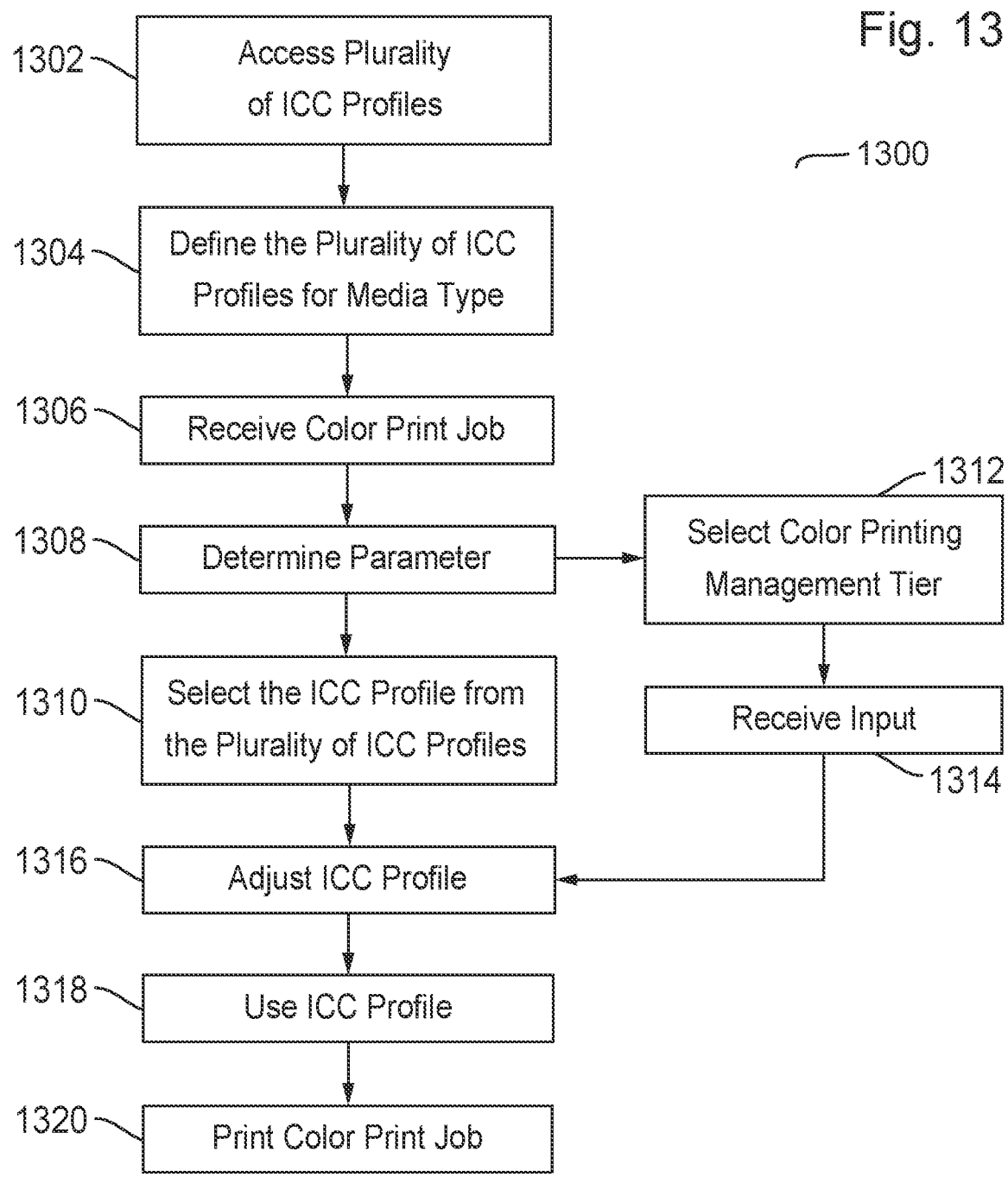

METHODS AND PRINTING SYSTEM FOR MULTI-TIER COLOR MANAGEMENT

FIELD OF THE INVENTION

The present invention relates to using an attribute for a color print job to determine a color printing management tier for managing color printing operations.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments from 10%-100%) are evident.

Individual production printing shops may attempt to work with, or practice, different levels of color reproduction quality. The print shop offering a higher level of color quality would invest in color management tools to enable the best color reproduction. A less demanding print shop, however, does not implement a simple way to achieve more fundamental color reproduction controls. One such control is the limiting of ink usage linked to setting price points for print jobs.

SUMMARY OF THE INVENTION

A method for managing color printing operations is disclosed. The method includes receiving a color print job of a document having a parameter. The method also includes selecting a color printing management tier according to the parameter. The method also includes using an input to adjust a tone reproduction curve (TRC) or ICC profile. The method also includes applying the TRC or ICC profile to process the color print job at the printing device. The method also includes printing the color print job at the printing device.

A method for managing color printing operations is disclosed. The method includes providing a plurality of color printing management tiers. The method also includes selecting one of the plurality of color printing management tiers for a color print job. The method also includes retrieving a tone reproduction curve (TRC) or an ICC profile according to the selected color printing management tier for the color print job. The method also includes applying the TRC or the ICC profile to color conversion operations for the color print job.

A color printing device is disclosed. The color printing device includes a processor and a memory to store instructions. The processor executes the instructions which configure the color printing device to provide a plurality of color printing management tiers. The instructions also configure the color printing device to select one of the plurality of color printing management tiers for a color print job. The instructions also configure the color printing device to retrieve a tone reproduction curve (TRC) or an ICC profile according to the selected color printing management tier for the color print job. The instructions also configure the color printing device to apply the TRC or the ICC profile to color conversion operations for the color print job.

A method for managing color printing operations is disclosed. The method includes defining a print media for a printing device. The print media is associated with metadata. The method also includes selecting a color printing management tier according to the metadata. The method also includes adjusting a tone reproduction curve (TRC) or an ICC profile according to the color printing management tier. The method also includes applying the TRC or the ICC profile to process a color print job at the printing device. The method also includes printing the color print job at the printing device.

A method for managing color printing operations is disclosed. The method includes defining a plurality of tone reproduction curves (TRCs) for a print media at a printing device. The method also includes receiving a color print job of a document having a parameter. The color print job uses the print media. The method also includes selecting a TRC from the plurality of TRCs based on the parameter. The method also includes applying the TRC to perform a color conversion process for the color print job. The method also includes printing the document on the print media at the printing device.

A method for managing color printing operations is disclosed. The method includes defining a plurality of ICC profiles for color conversion to color print on a print media at a printing device. The method also includes receiving a color print job of a document having a parameter. The color print job uses the print media. The method also includes selecting an ICC profile from the plurality of ICC profiles based on the parameter. The method also includes using the ICC profile to perform a color conversion process for the color print job. The method also includes printing the document on the print media at the printing device.

BRIEF DESCRIPTION OF THE DRAWINGS

Various other features and attendant advantages of the present invention will be more fully appreciated when considered in conjunction with the accompanying drawings.

FIG. 12 illustrates a flowchart for selecting the TRC from a plurality of TRCs according to the disclosed embodiments.

FIG. 13 illustrates a flowchart for selecting the ICC profile from a plurality of ICC profiles according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet. Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments allow more intelligent management of color resources within a printing system. The disclosed embodiments retain metadata about color management resources that may be used to provide more intelligent interactions between color management resources. These features would be enabled for both calibration TRCs and ICC profiles. When calibrating a printing device, the system prints a test chart with colorant ramps. The colorant ramps are used to define the TRC for each colorant as part of known printing device calibration.

When saving the calibration TRCs, the system also will save the raw measurement data. The disclosed embodiments uses this information in a more intelligent manner. For calibration, the calibration data is not only generated but it is retained and persistently associated with one or more TRCs. This feature allows the operator or the system to edit TRC settings at any time, even after calibration is completed. For recalibration, if it is successful, then the disclosed embodiments will use the new measurement data and generate a TRC per calibration behavior. If multiple TRCs are generated, however, from the same measurement data, then the disclosed embodiments will update all TRCs using the same measurement data. Other operations and features are enabled if recalibration fails.

Figure 1:
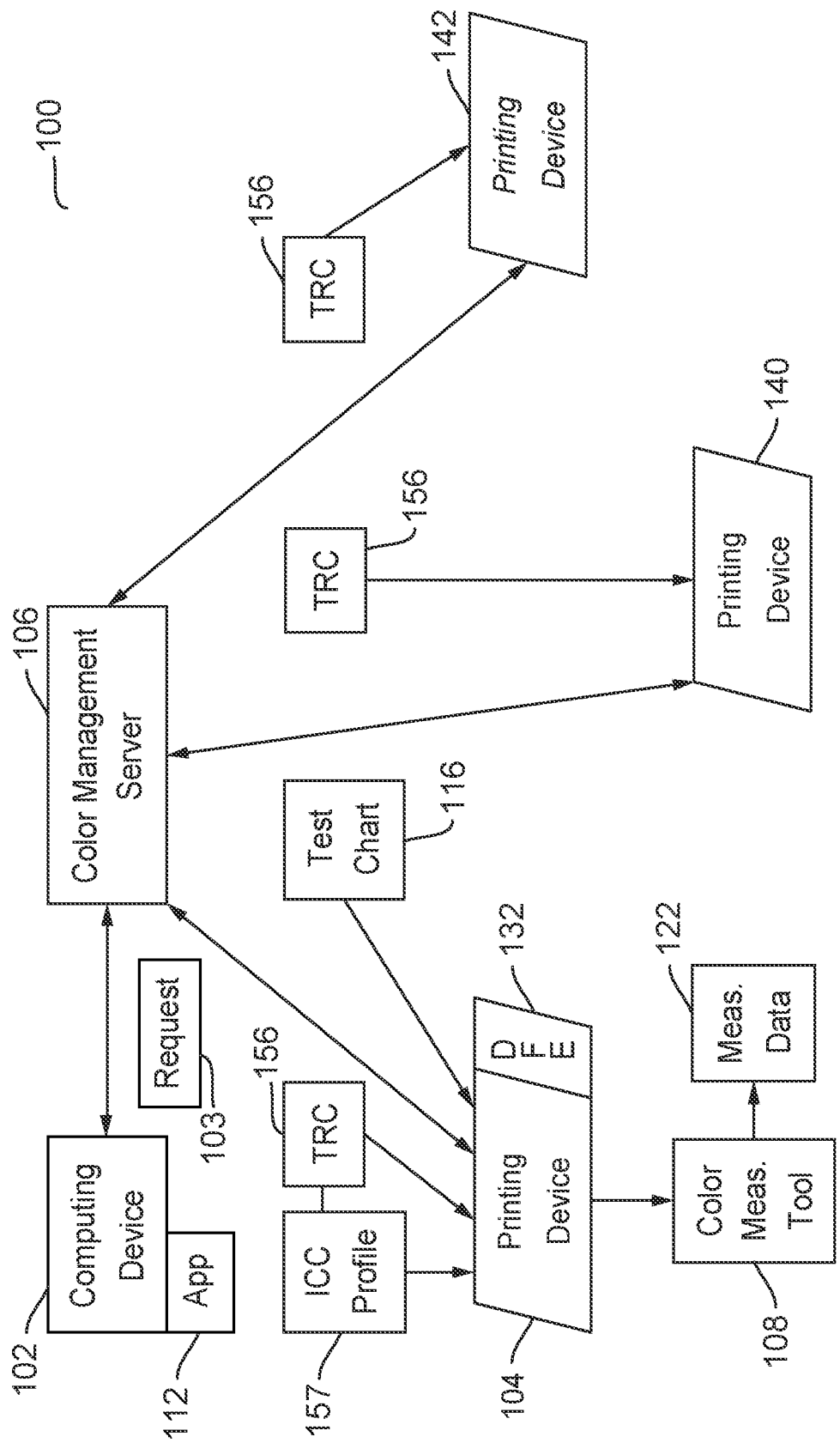
FIG. 1 illustrates a block diagram of a color management system for printing devices according to the disclosed embodiments.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive instructions to perform calibration print jobs and quality checks from color management server 100. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFB) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122.

System 100 also allows customers to select the color management effort or cost versus quality tradeoff that makes sense for the print shop using the system. A print job may include an attribute that is used to select a color printing management tier from a plurality of tiers. The tiers may include a media type color management tier, an ink limited calibration tier, and a calibration and ICC profile creation tier. These tiers are disclosed in greater detail below.

When a document is printed in system 100, the disclosed embodiments will look at the selected media or attribute to determine which color printing management tier should be applied to the print job. The disclosed embodiments may select either ink limited calibration or ICC Profile creation, but not both. In other words, these tiers may be mutually exclusive. If neither tier is specified, then the disclosed embodiments may default to the media type color management tier.

The disclosed embodiments also allow for the definition of multiple TRCs or ICC profiles for a given media. A customer or system 100 may have the option to specify which TRC or ICC profile to use based on either direct selection or based indirect selection. Indirect selection refers to an instance where the customer associates specific color conversion settings with an attribute that is evaluated in addition to the selected media. For example, the customer may specify a "print condition" value that is used to select between multiple TRCs or ICC profiles for a given media. Unlike the TRC or ICC profile selection, the print condition values may be reused with multiple media to select high quality versus economy printing for a color print job.

Figure 2:
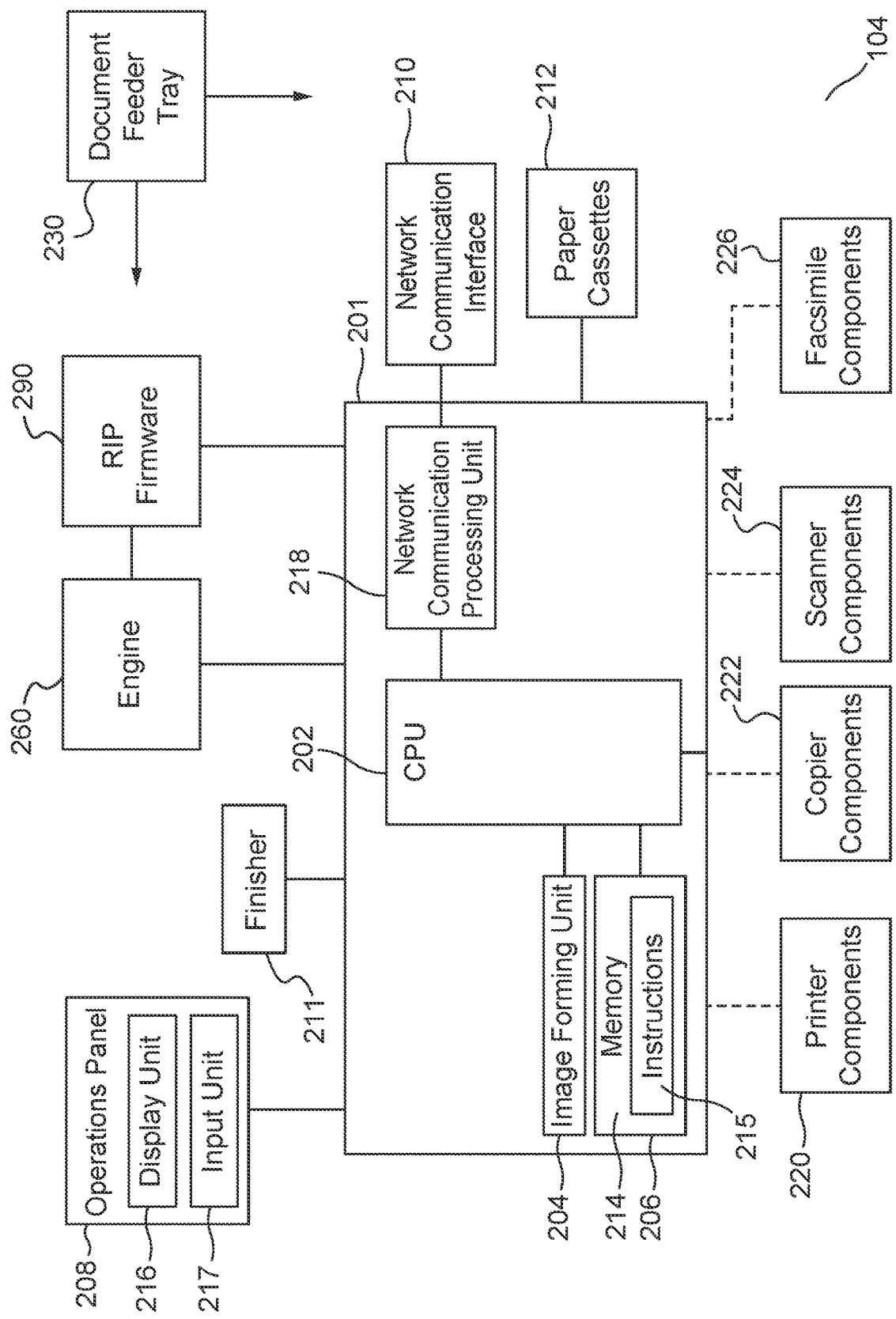
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

Figure 3:
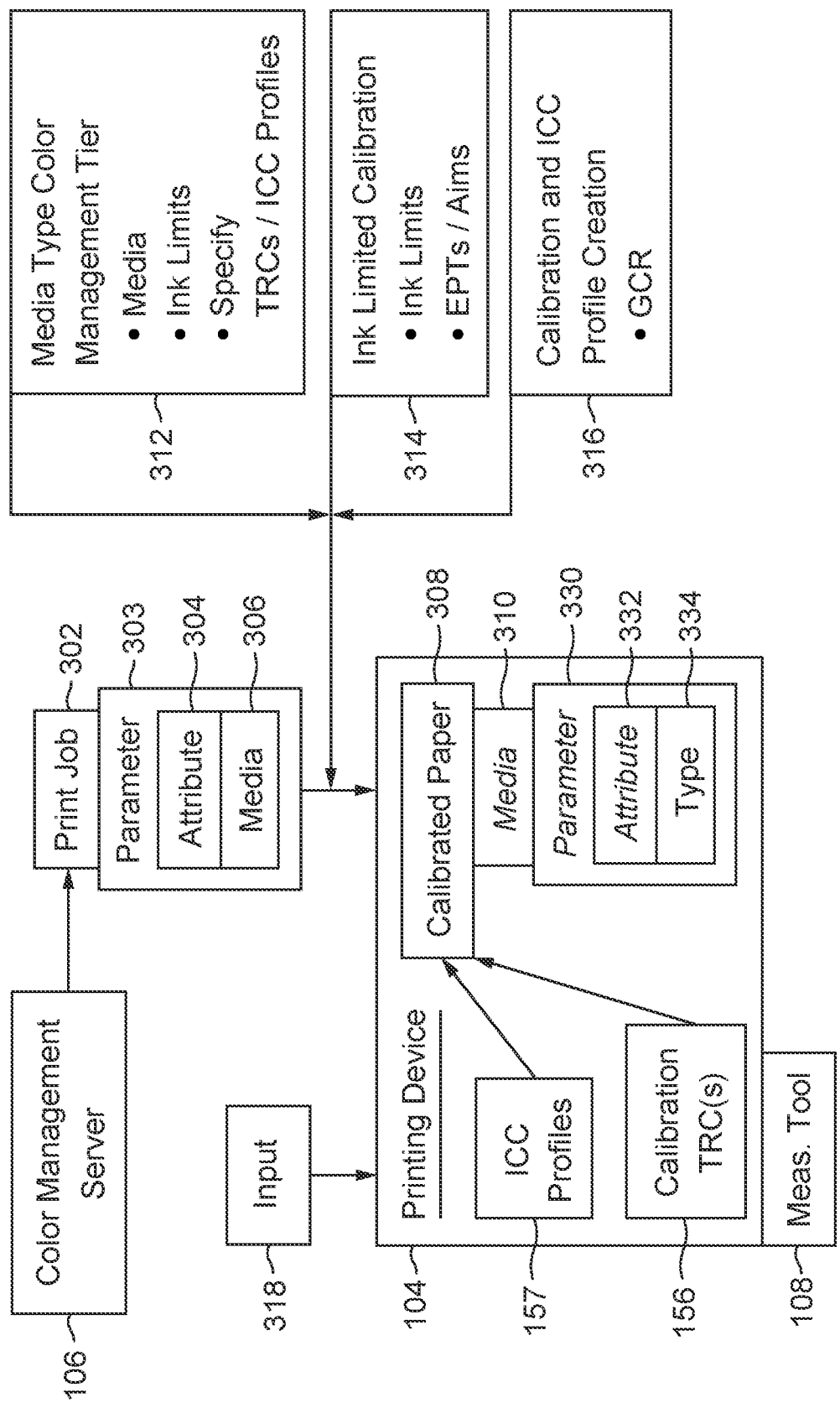
FIG. 3 illustrates a block diagram of color printing management tiers for use with a printing device in processing a print job according to the disclosed embodiments.

FIG. 3 depicts a block diagram of color printing management tiers for use with printing device 104 in processing print job 302 according to the disclosed embodiments. Color management server 106 also is shown as managing printing operations and color printing resources on printing device 104. Alternatively, printing device 104 may manage printing operations and color printing resources as disclosed below. Color management server 106 allows a customer or operator to elect how color will be managed. Color is managed to a plurality of color management tiers.

Print job 302 may include a parameter 303 that may be used in selecting the appropriate color management tier. Parameter 303 may be an attribute 302 associated with color conversion settings. Attribute 304 may be a setting for color conversion, such as an end point target, aim, ink limit, total area coverage, gray component replacement, and the like. One or more settings may be defined that then invokes the desired color management tier.

Parameter 303 may relate to selected paper media type 306 for print job 302. Parameter 303 is used to determine which color printing management tier to use in processing the print job. An operator may indicate which tier to use or it may be determined based on instructions for print job 302. Further, print job 302 includes a media type, or paper media, 306 for the print job. Color management server 106 or printing device 104 may look at media type 306 to determine which color management tier to be applied. In some embodiments, media type 306 may defined along with attribute 304. They are shown separately here for illustrative purposes.

Printing device 104 stores TRCs 156 and ICC profiles 157, as disclosed above. These components may be applied to calibrated paper 308 loaded on printing device 104. Calibrated paper 308 may be a specified media 310, such as glossy paper, A4 paper, plain white paper, and the like. Print job 302 may use calibrated paper 308 to print documents having color features using one of the color management tiers.

Calibrated paper 308 also may have metadata associated with media 310. The metadata for media 310 may include parameter 330. Much like parameter 303, parameter 330 may include an attribute 332 and media type 334. This information may be set when calibrated paper 308 is loaded onto printing device 104. Printing device 104 may recognize media 310 for calibrated paper 308 and retrieve the metadata associated with the media from color management server 106. For example, media 310 relates a type 334 of paper that results in an attribute 332 defining a TRC setting for color printing calibrated paper 308. The metadata may be modified or updated at printing device 104 as calibration paper 308 is being used.

The color management tiers relate to how much effort or resources will be used in processing print job 302. Media type color management tier 312 may be selected according to attribute 304 or attribute 332. Tier 312 may require the least amount of effort and, as a result, be the more economical approach to color printing. Printing device 104 categorizes all media into different media types. Thus, calibrated paper 308 is categorized into media 310 having type 334. Printing device 104 will contain TRCs and ICC profiles for these media types. Again, as shown, TRCs 156 and ICC profiles 157 apply to printing operations for calibrated paper 308. Each media type may include its own TRCs and ICC profiles. Although not shown, printing device 104 may include several types of calibrated paper. Each calibrated paper uses its own TRCs and ICC profiles, like calibrated paper 308 and TRCs 156 and ICC profiles 157.

When print job 302 is received, printing device 104 identifies media 310 for calibrated paper 308. Color conversion at printing device 104 will use default TRCs 156 and ICC profiles 157. One or more documents are printed on calibrated paper 308 according to the parameters set forth by TRCs 156 and ICC profiles 157. This process may not allow for the definition of calibration targets or ICC profile ink limits.

Media type color management tier 312 will allow the disclosed embodiments to edit TRCs 156 for media 310 in order to change calibration end point targets (EPTs). This feature may be achieved by include measurement data 122 with TRCs 156. Measurement data 122 is used to generate new TRCs 156 when TRC settings are adjusted. These edits may be received as input 318 to adjust TRCs 156 or ICC profiles 157.

Figure 4:
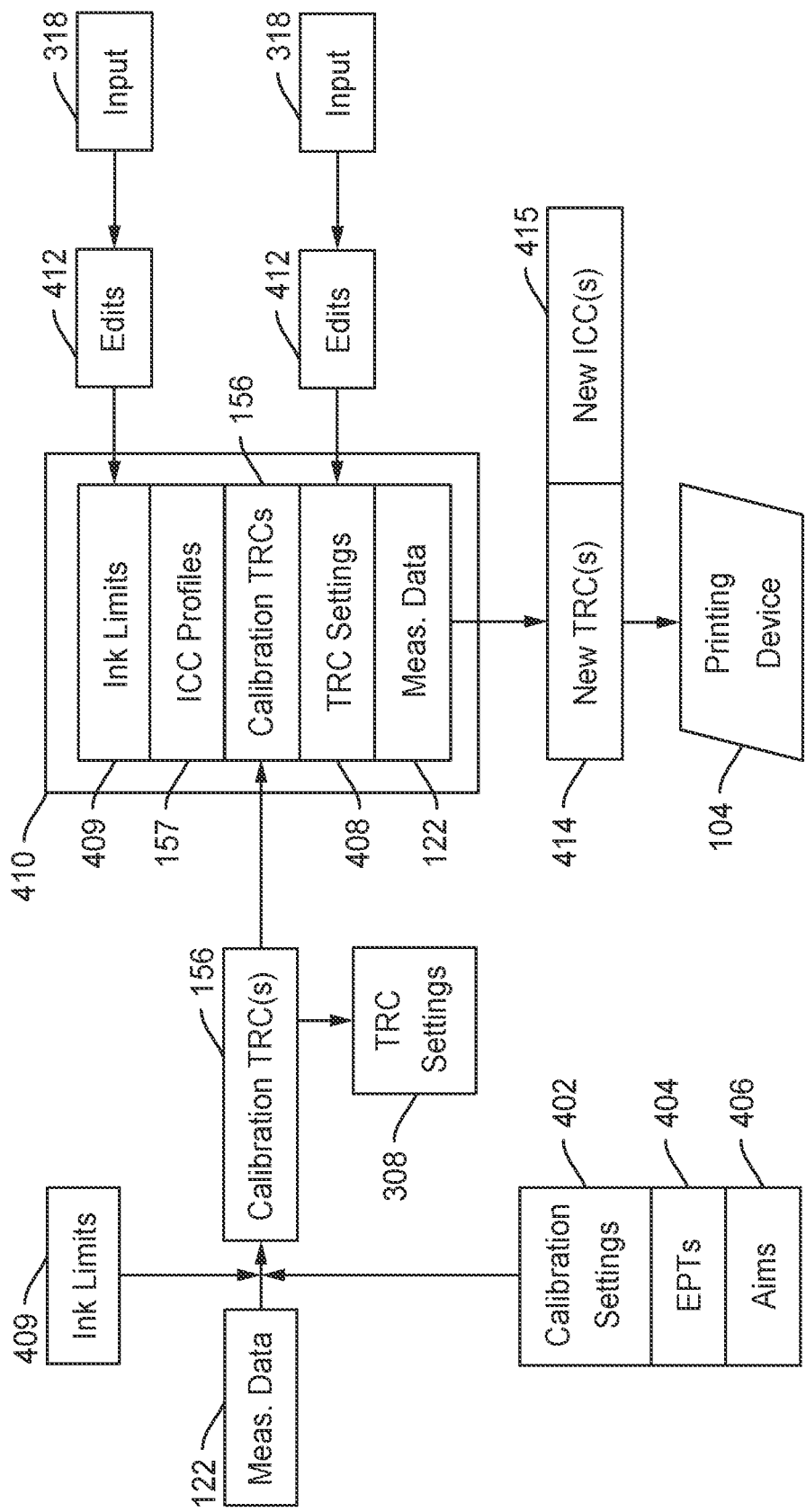
FIG. 4 illustrates a block diagram of data flow for editing TRCs or ICC profiles using an input according to the disclosed embodiments.

An example of this process may be disclosed by FIG. 4. FIG. 4 depicts a block diagram of data flow for editing TRCs 156 or ICC profiles 157 using input 318 according to the disclosed embodiments. Calibration is a process that enables an operator to measure the output of printing device 104 against test chart 116. The process allows system 100 to adjust for "drift" in the color response of the printing device to achieve consistent results. As disclosed above, calibration measurement data 122 is captured using test chart 116 at printing device 104 as well as other printing devices in system 100. Calibration settings 402 may be defined for measurement data 122. Calibration settings 402 include end point targets 404 and aims 406. End point targets 404 relate to the specified maximum densities for colors in printing to a paper media Aims 406 relate to the dot gain to achieve desired colors for color printing.

Calibration settings 402 are used in conjunction with measurement data 122 to generate calibration TRCs 156. A TRC 156 may be used by printing device 104. Calibration settings 402 also may be changed or updated to modify a calibration TRC 156 or create a new one while in media type color management tier 312. TRC settings 408 also are generated. TRC settings 408 relate to calibration settings 402 except that they are associated with the generated TRC(s). TRC settings 408, therefore, may include end point targets and aims applicable to generated calibration TRCs 156.

Calibration TRCs 156, TRC settings 408, and measurement data 122 associated with generated the TRCs may be stored together as a calibration data set 410. Calibration data set 410 may include other information, such as applicable printing devices for the calibration TRCs. Calibration data set 410 may be stored at color management server 106 for use when color printing to those devices that utilize the respective TRCs 156. In this instance, calibration data set 410 may be stored at printing device 104 or other printing devices. Measurement data 122 is retained and persistently associate with calibration TRCs 156.

According to the disclosed embodiments, edits 412 may be made to TRC settings 408. Edits 412 may be made at any time, even after calibration. An operator may edit TRC settings 408, such as EPTs 404 or aims 406, after receiving print job 302. Using measurement data 122, the disclosed embodiments may generate new calibration TRCs 414 with the updated settings. The operator also may edit TRC settings 408 after they have been created and associated with generated calibration TRCs 156 within calibration data set 410 to generate new calibration TRCs 414. Edits 412 may be received as input 318 provided at printing device 104 or through color management server 106.

TRC settings 408 preferably receives edits 412 for calibration TRCs 156 already installed at printing device 104. Printing device 104 or color management server 106 may find measurement data 122 and use it to generate new or updated calibration TRCs 414. Printing device 104 may store new calibration TRCs 414. Alternatively, color management server 106 may then push new calibration TRCs 414 to printing device 104. This process also may be performed in printing device 104 then pushed to other components within system 100.

Figure 5:
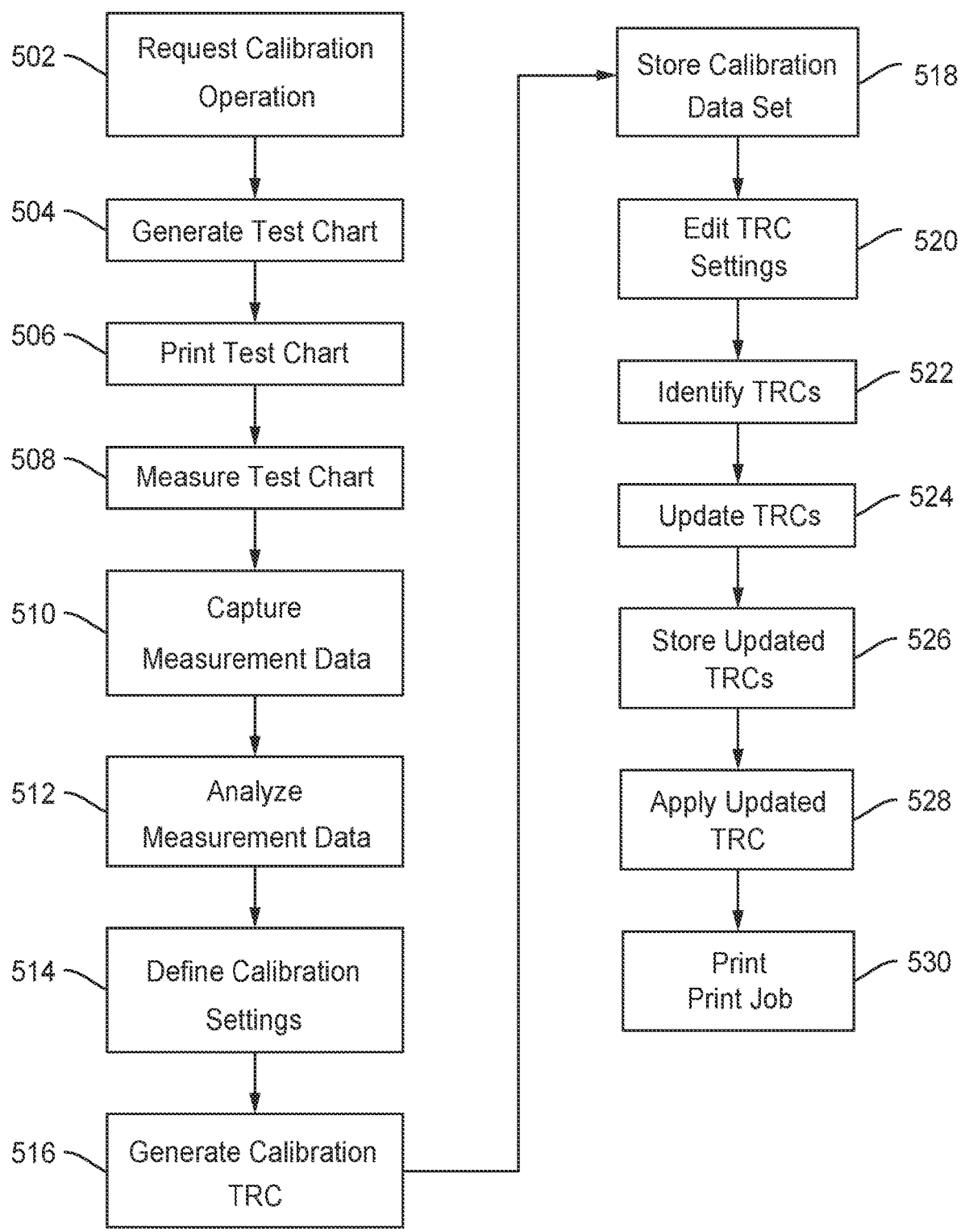
FIG. 5 illustrates a flowchart for managing color management resources using measurement data and TRC settings in the media type color management tier according to the disclosed embodiments.

FIG. 5 depicts a flowchart 500 for managing color management resources using measurement data 122 and TRC settings 408 in media type color management tier 312 according to the disclosed embodiments. Flowchart 500 may refer to FIGS. 1-4 for illustrative purposes. The embodiments disclosed by flowchart 500, however, are not limited by FIGS. 1-4. Some of the steps disclosed by flowchart 500 relates to calibration operations disclosed in FIG. 1.

Step 502 executes by requesting a calibration operation to be performed for managing color printing resources within system 100. Request 103 may be received at color management server 106 to perform and oversee the calibration operation. Step 504 executes by generating test chart 116 for the calibration operation. Test chart 116 may include color patches for the colors of interest in the calibration, such as cyan, magenta, yellow, and black. Test chart 116 is sent to one or more printing devices, such as printing device 104.

Step 506 executes by printing test chart 116 at printing device 104. Test chart 116 may be printed on a specified paper media set forth by the calibration operation. The printed document includes the color patches with colorant ramps used to define the TRC for each colorant. Step 508 executes by measuring test chart 116. The color patches, for example, are scanned using color measurement tool 108 to capture the printed color parameters. Step 510 executes by capturing measurement data 122 from color measurement tool 108. Measurement data 122 also may be known as calibration data.

Step 512 executes by analyzing measurement data 122. Preferably, measurement data 122 is sent from printing device 104 to color management server 106. Color management server 106 analyzes the data to complete calibration operations. Step 514 executes by defining calibration settings 402 for the calibration operations. Calibration settings 402 may include end point targets 404 and aims 406. Step 514 may be executed at any time before this step. For example, calibration settings 402 may be defined by the operator when requesting the calibration operation be done or when generating test chart 116.

Step 516 executes by generating calibration TRCs 156 using measurement data 122 and calibration settings 402. TRC settings 408 also are generated and associated with the calibration TRC and measurement data 122. This information may be known as calibration data set 410. In some embodiments, more than one TRC 156 is generated and associated with TRC settings 408 and measurement data 122. Step 518 executes by storing calibration data set 410, which includes calibration TRCs 156, TRC settings 308, and measurement data 122. In some embodiments, calibration data set 410 is stored at color management server 106 as well as at printing device 104. In other embodiments, calibration data set 410 is stored on printing device 104 and retrieved as needed by color management server 106.

Step 520 executes by editing TRC settings 408. TRC settings 408 may be edited as part of media type color management tier 312. For example, TRC settings 408 may receive edits 412 after printing test chart 116 as the calibration target. Edits 412 to TRC settings 408 may be received after generation of TRC 156 or after installation in printing device 104. For example, an end point target 404 may be edited, which will impact TRCs generated using TRC settings 408. Preferably, after print job 302 is received, input 318 is received with edits 412.

Step 522 executes by identifying calibration TRC or TRCs 156 associated with measurement data 122 corresponding to edited TRC settings 408. For example, TRCs 156 generated using measurement data 122 may be used in conjunction with media type 310. Media type 306 for print job 302 may be used to associate with media type 310 and, in turn, measurement data 122. Multiple TRCs may be stored on printing device 104. The common feature is the use of measurement data 122 to generate the TRCs. Step 524 executes by updating calibration TRCs with the edited TRC settings to generate new TRCs 414. Edited TRC settings 408 are used to generate new TRC 414 using measurement data 122. Another calibration operation is not needed.

Step 526 executes by storing new, or updated, TRC or TRCs 414 to printing device 104. As noted above, a plurality of TRCs 156 may be associated with measurement data 122 and identified to be updated with edited TRC settings 408 received with input 318. All of these TRCs are updated to generate new TRCs 414. Step 528 executes by applying updated TRCs 414 in color printing operations. The new TRC replaces the older, or original, TRC 156. The parameters specified by edited TRC settings 408 are enforced. Step 530 executes by printing color print job 302 at printing device 104 to produce a color document according to updated TRCs 414.

Referring back to FIG. 3, media type color management tier 312 also allows the disclosed embodiments to edit ICC profiles 157 for media type 310 in order to increase or decrease the ink limits. Edits to ICC profiles 157 may be achieved using input 318 and by using measurement data 122 or by directly editing the ICC profiles. The process may be similar to the one for editing TRC settings 308 except that updates or changes apply to the ink limits.

Referring to FIG. 4, ink limits 409 may be specified at the time of capturing measurement data 122 and generating calibration TRCs 156. Ink limits 409 may be associated with ICC profiles 157, also generated using measurement data 122. As disclosed above, ICC profiles 157 may be built on calibration data. Ink limits 409 and ICC profiles 157 may be stored with data set 410 along with measurement data 122.

When media type color management tier 312 is selected, the operator may edit ICC profiles 157 associated with media type 310 for calibrated paper 308 before print job 302 is processed. Input 318 includes edits 412 to ink limits 409. Edits 412 may increase or decrease ink limits 409. As such, the disclosed embodiments may generate new ICC profiles 415 to apply for color printing of print jobs for calibrated paper 308. New ICC profiles 415 may be stored on printing device 104.

Media type color management tier 312 may allow edited TRCs 414 and ICC profiles 415 to be stored on printing device 104. The edited TRC settings 408 and ink limits 409 also may be saved as the new settings for TRCs 414 and ICC profiles 415, respectively. If multiple TRCs or ICC profiles are specified for a single media type 310, then the disclosed embodiments will allow the operator to specify which of the available TRCs or ICC profiles should be used for color printing.

The features of media type color management tier 312 would allow customers to control the amount of ink used without the need to purchase a spectrophotometer as color measurement tool 108 and without spending any time on color management. A customer or operator may directly edit settings for color management resources at printing device 104. Tier 312 provides ink use control at no cost or effort from the customer or operator. Further, tier 312 may be the default tier if no tier is selected. Color conversion may be managed by media type.

Attribute 304 may indicate that ink limited calibration tier 314 is used to manage color printing for calibrated paper 308 having media type 310 at printing device 104. In this tier, printing device 104 provides functionality to allow the customer or operator to linearize, or calibrate, the color response from the printing device. Calibration functionality is disclosed above and typically provided in printing device 104. Printing device 104 prints test chart 116, which is measured to capture measurement data 122. TRCs 156 are generated and installed in DFE 132. Typical calibration, however, only may provide maximum density control, which is limited.

The disclosed embodiments leverage the functionality for ink limited printing and calibration, as disclosed below, to allow customers or operators to control maximum density and total ink use for individual papers or paper groups. Unlike tier 312, ink limited calibration tier 314 need to use a color measurement tool 108, such as a spectrophotometer, and perform calibration tasks. Calibration, however, is a relatively quick operation that seldom requires scanning more than a few rows of color patches on test chart 116. Ink limited calibration tier 314 provides consistent output and ink use control with minimal effort from the customer or operator.

Figure 6:
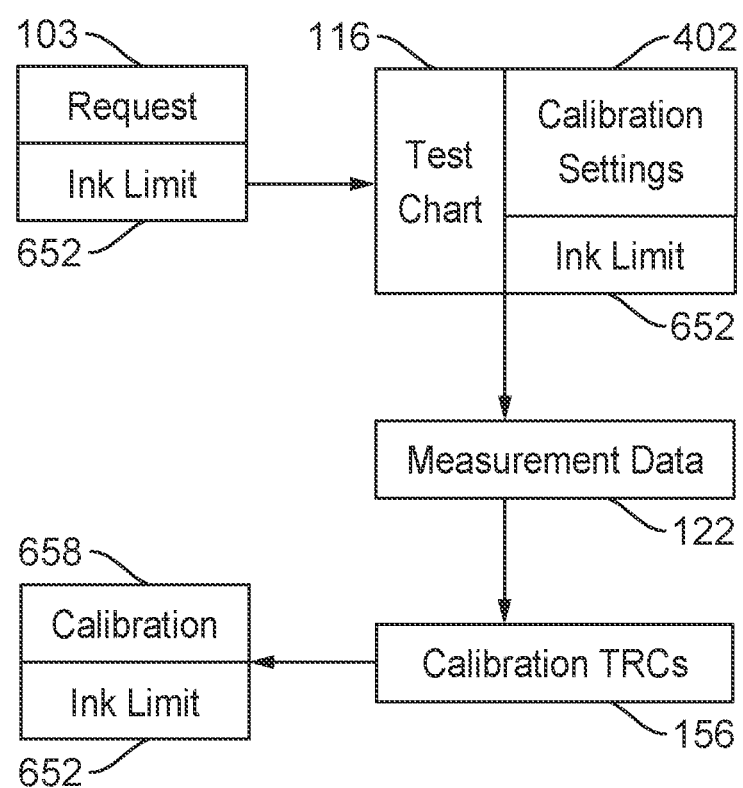
FIG. 6 illustrates a block diagram of the process flow of data for a calibration process for the ink limited calibration tier according to the disclosed embodiments.

FIG. 6 depicts a block diagram of the process flow of data for a calibration process for ink limited calibration tier 314 according to the disclosed embodiments. FIG. 6 depicts an example scenario for applying tier 314 to manage color printing on printing device 104. After selecting tier 314, request 103 with ink limit 652 may be received along with calibration settings 402. Calibration settings 402 may include EPTs 404 and aims 406. Test chart 116 is generated accordingly and sent to printing device 104 for calibration operations. Ink limit 652 and calibration settings 402 associated with test chart 116 are stored. This information may be stored at printing device 104 or at color management server 106.

The operator or printing device measures test chart 116 after it is printed out at the printing device. Measurement data 122 is captured by measuring the color patches on test chart 116 and the printed colors associated therewith. The data is provided to printing device 104 or back to color management service 106 for analysis. Using the measured data, the disclosed embodiments generate calibration tone reproduction curves (TRCs) 156 using calibration settings 402. Calibration settings 402 include end point targets and aims for the colors. Once calibration TRCs 156 are created, they are stored at printing device 104 in digital front end (DFE) 132 as calibration 658 for calibrated paper 308. Printing device 104 also will store ink limit 152 and store them with the calibration information.

Figure 7:
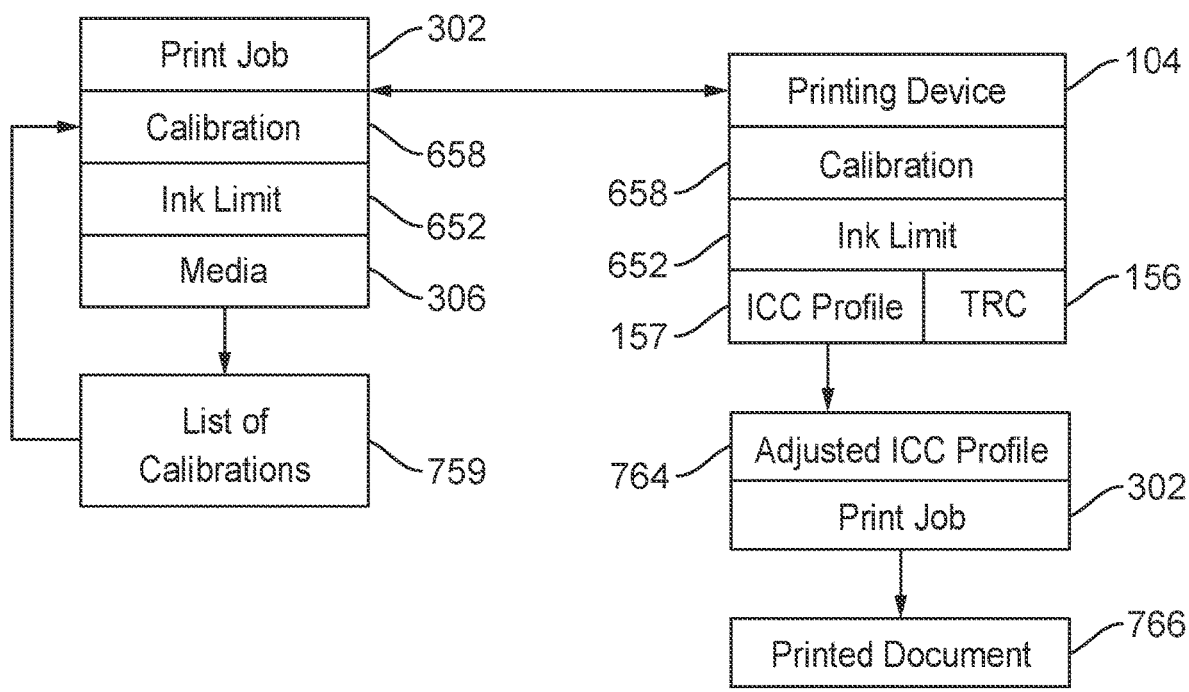
FIG. 7 illustrates a printing process in the system using the ink limited calibration tier according to the disclosed embodiments.

FIG. 7 depicts a printing process in system 100 using ink limited calibration tier 314 according to the disclosed embodiments. FIG. 7 may depict an example printing process using tier 314 that allows one to control maximum density and total ink use for color printing.

Color printing of print job 302 is requested. With print job 302, calibration 658 is identified that should be used. The identification may occur by specifying calibration 658 from a list of calibrations 759. As can be appreciated, a plurality of calibrations may apply to color printing on printing device 104. As noted above, test charts 116 may be used to generate calibrations for different types of print jobs requiring color printing. Calibration 658 may be selected in other ways. For example, calibration 658 may identified indirectly by specifying paper selection, or media type 306, with print job 302. Thus, media type 306 is specified and calibration 658 associated with the media is selected. List of calibrations 759 may be queried according to media type 306 to identify calibration 658. Alternatively, nothing may be specified with print job 302 so that a default calibration is used.

With calibration 658, printing device 104 retrieves ink limit 652 specified earlier with the calibration operations. Printing device 104 also retrieves ICC profile 157 associated with calibrated paper 308 for print job 302. It also may identify a TRC 156, if needed. ICC profile 157 may be referenced in the print instruction for print job 302 or downloaded by the controller at printing device 104. ICC profile 157 also may be embedded in print job 302. ICC profile 157 may already be in DFE 132 of printing device 104. ICC profile 157 may be a default ICC profile stored at printing device 104.

ICC profile 157 may be used to define the color of image data in a way to make it possible to exchange images between systems, while retaining any color requirements imposed in the image. Part of these requirements may be ink limits. ICC profile 157 is used to enable color reproduction at printing device 104 for the specified colors applicable to print job 302. ICC profile 157 may provide a number of color transformations that define the color expected from the encoded data of the digital image of print job 302, in an open format. The transformations may be accomplished using look-up tables, matrices, parametric curves, and the like. ICC profile 157 includes multiple transformations. An objective of ICC profile 157 is to ensure that colors from the input of print job 302 will match those on the output, or printed document 766 shown in FIG. 7, assuming the output has an adequate color gamut.

Once ICC profile 157 is selected, printing device 104 will specify or read ink limit 652, or ink limit value, to automatically adjust ICC profile 157. Thus, ink limit 652 specified above and stored with calibration TRC 156 and calibration data 122 is applied to generate adjusted ICC profile 764. Adjusted ICC profile 764 may be provided with print job 302 to printing device 104. Printing device 104 may perform color conversion using adjusted ICC profile 764 using normal color conversion processes in order to print printed document 766 that includes the color images and data corresponding to those in print job 302. In some embodiments, the adjustment to the ICC profile may be done as part of the ink limited calibration so that the adjusted ICC profile is already available when it comes time to process the print job.

Ink limit 652 may relate to the total ink limit (TIL) for color printing. TIL may relate to media type 310 for calibrated paper 308 or printing device limitations. TIL also may be known as total area coverage (TAC). Ink limit, or TIL, 652 prevents over-inking and optimizes the dynamic range of printing device 104. Ink limit 652 may relate to the maximum possible percentage of ink that may be used for color printing. In other words, the ink limit stems from the fact that only so much ink can be used in a media. The interaction between ink and media will impact the color. Too much ink may cause run offs or other problems. Ink limit 652 may be enforced within adjusted ICC profile 764 such that certain patches within the gamut over the ink limit will be adjusted according when producing printed document 766. Adjusted ICC profile 764 adheres to ink limit 652.

Calibration TRC 156 also may be identified and used to perform TRC adjustments to the converted color output from adjusted ICC profile 764. Calibration TRC 156 may be used to achieve certain effects on a consistent basis. The disclosed processes enable printing system 100 to access ink limiting functionality without having to create ICC profiles. Ink limit 652 is applied without creation of an ICC profile. System 100 or printing device 104 does not need to know anything about ICC profiles in establishing ink limit 652.

In some embodiments, ink limit 652 may be received with print job 302. Thus, it is not stored with calibration TRC 156. This feature may be applicable in instances that print job 302 also includes original ICC profile 157. The same processes may be used to generate adjusted ICC profile 764 using ink limit 652 but without the need for calibration. The disclosed embodiments also may include instances where adjusted ICC profile 764 is generated as part of the calibration operations along with calibration TRC 156. Ink limit 652 is specified and applied accordingly. Adjusted ICC profile 764 may be stored with calibration TRC 156.

Ink limit 652 also may be adjusted during printing operations. It may be increased or decreased according to operator instruction using input 318. If so, then the disclosed processes on generating adjusted ICC profile 764 may be repeated so that the new ink limit is applied to color printing operations. Thus, ink limits are adjusted after the fact. The disclosed embodiments can dynamically apply ink limits in color printing without having the recreate ICC profiles each time an ink limit is changed.

Figure 8:
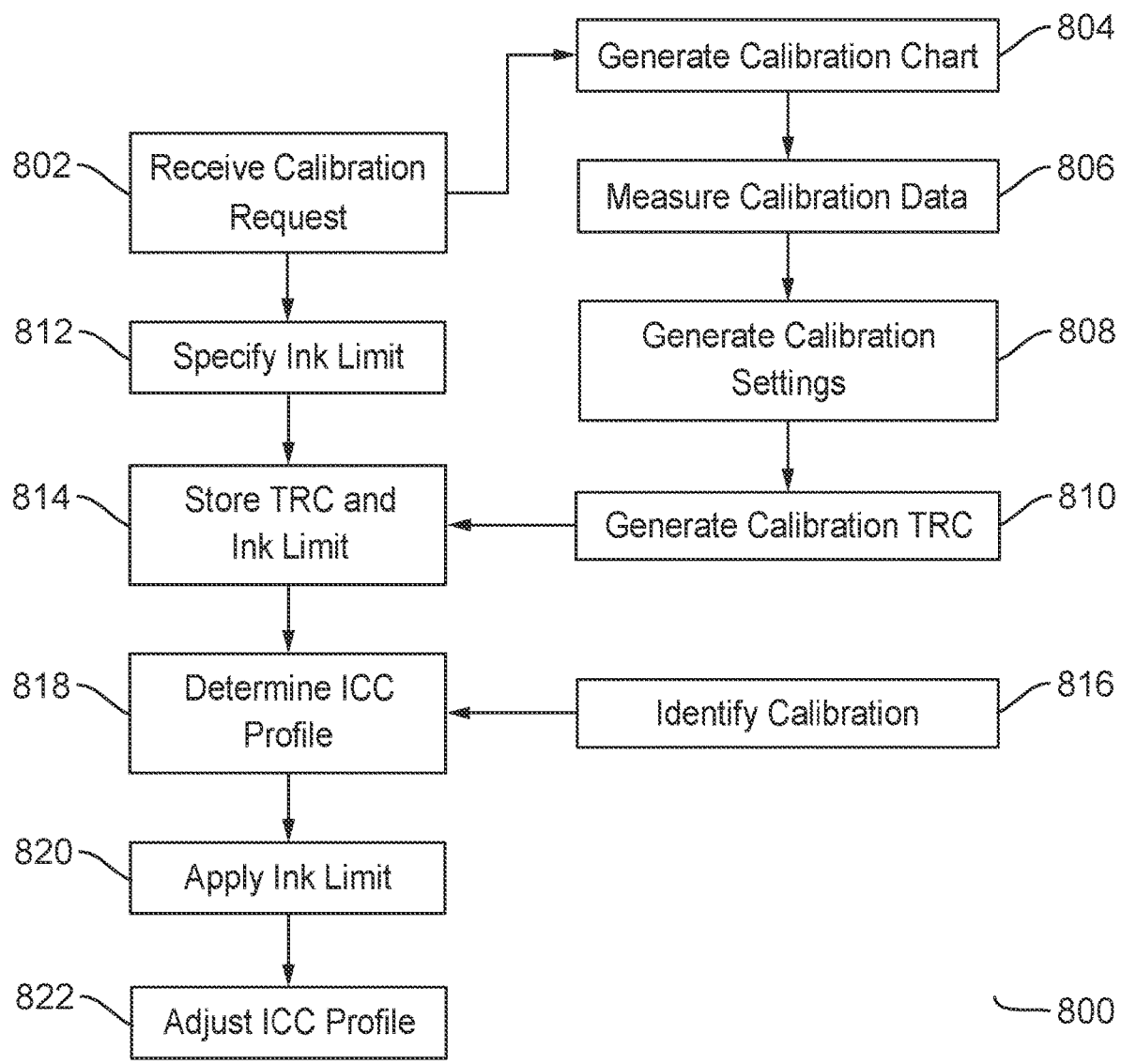
FIG. 8 illustrates a flowchart for performing color management of the printing device using the ink limited calibration tier according to the disclosed embodiments.

FIG. 8 depicts a flowchart 800 for performing color management of printing device 104 using ink limited calibration tier 314 according to the disclosed embodiments. Flowchart 800 may refer to elements of FIGS. 1-7 for illustrative purposes. Flowchart 800, however, is not limited to the embodiments disclosed by FIGS. 1-7.

Step 802 executes by receiving a calibration request at printing device 104 or color management service 106. In some embodiments, request 103 is received at printing device 104 or color management service 106 to perform a calibration operation on the printing device within system 100. The calibration operation may be performed on all printing devices within system 100. In alternate embodiments, the calibration request may be received directly at printing device 104.

Step 804 executes by generating test chart 116, as disclosed above. Test chart 116 is sent to printing device 104. It also may be sent to other printing devices within system 100. In some embodiments, color management service 106 generates test chart 116. Alternatively, printing device 104 may do so or may retrieve a stored test chart to use. Printing device 104 prints test chart 116. Step 306 executes by measuring and capturing measurement data 122 using the color patches of test chart 116. Color measurement tool 108 may be used to capture measurement data 122. Measurement data 122 may be provided to printing device 104 or color management service 106 for processing and analysis.

Step 810 executes by generation one or more calibration TRCs 156 using calibration settings 402, such as end point targets and aims. Calibration settings 402 may be generated in a previous step and stored with test chart 116. Alternatively, calibration settings 402 may be modified based on measurement data 122.

Step 812 executes by specifying ink limit 652 for the calibration operation. Ink limit 652 may be specified in request 103. Ink limit 652 may be a value such as 250% which denotes a predefined value of the maximum possible percentage of ink that may be used to reproduce colors, as disclosed above. Step 814 executes by storing calibration TRC 156 and ink limit 652. Ink limit 652 also may be specified prior to steps 804-810 and stored with test chart 116, as well as calibration settings 402/TRC settings 408, if applicable. In some embodiments, these elements are downloaded to printing device 104. They may be stored in the DFE of printing device 104. Alternatively, these elements may be stored with color management service 106. Calibration 658 is associated with calibration TRC 156, ink limit 652, as well as, if applicable, calibration settings 402/TRC settings 408, and test chart 116.

To generate an ICC profile adjusted for ink limit 652, flowchart 800 executes step 816 by identifying calibration 658. The identification of calibration 658 may occur several ways. For example, identification may be done directly by specifying calibration 658 from a list of calibrations 759. Calibration 658 may be specified by the print job, such as print job 302 received by color management service 106 or printing device 104. Calibration 658 may be a default calibration, which is selected by some criteria or instruction. Calibration 658 also may be selected according to media type 306 of print job 302.

Step 818 executes by determining ICC profile 157 associated with calibration 658. Calibration 658 also is used to determine applicable calibration TRC 156 and ink limit 652. Ink limit 652 may be retrieved from its storage location within color management service 106 or printing device 104. Printing device 104 may use memory 206 to store data. ICC profile 157 may correspond to one or more calibration TRCs 156 generated from calibration data 122. ICC profile 157 is not generated or created with any regard to ink limit 652.

It should be noted that the disclosed embodiments also include those features that allow ink limit 652 to be changed after creation of ICC profile 157. Ink limit 652 may be increased or decreased accordingly. Thus, when the processes embodied by flowchart 800 are repeated, the new ink limit is applied to ICC profile 157 to implement the increase or decrease. This feature alleviates the need to totally create new ICC profiles based on the changes.

Step 820 executes by applying ink limit 652 to ICC profile 157. Step 822 executes by adjusting ICC profile 157 according to ink limit 652 to generate adjusted ICC profile 764. Adjusted ICC profile 764 is used for printing operations by printing device 104. In this manner, ink limit 652 is specified as part of the calibration process. A new ICC profile does not need to be created when ink limit 652 is specified. Instead, ink limit 652 is used to adjust an existing ICC profile, thereby reducing the work needed to maintain and use ICC profiles. Thus, the processes associated with ink limited calibration tier 314 may provide consistent output and ink use control with minimal effort from the customer or operator. It also provides a different manner of color management for printing device 104 than tier 312.

Referring back to FIG. 3, attribute 304 may indicate calibration and ICC profile creation tier 316 should be used to manage color printing on printing device for print job 302. Using this tier, printing device 104 provides the typical functionality available in production printing devices. Tier 316 may provide the highest level of quality. The operator, however, must calibrate and the measure dozens of rows of color patches for each ICC profile. Calibration and ICC profile creation tier 316 may act as normal color conversion processes on printing devices.

Tier 316, however, also may receive input 318 to modify some aspect of the color conversion resources. For example, input 318 may control gray component replacement for color printing operations. Gray component replacement is the replacement of cyan, magenta, or yellow inks used in color printing with black ink, whenever they overprint. Black ink tends to be cheaper than other colors. This process increases the amount of black ink with a proportionate decrease in the other color inks. This value may determine how aggressive printing device 104 may be with replacing color inks with black ink. Total ink coverage also may be reduced using gray component replacement.

According to the disclosed embodiments, printing device 104 may use ink limited calibration tier 314 or calibration and ICC profile creation tier 316 but not both. When print job 302 is received, printing device 104 or color management server 106 may look at media type 306 and determine which color management tier should be applied for color printing. Either tier 314 or tier 316 may be specified. If neither is specified, then printing device 104 will default to tier 312.

The disclosed embodiments also allow the customer or operator to define multiple TRCs or ICC profiles for a given media. One will have the option to specify which TRC or ICC profile to use based on direct selection or indirect selection. Indirect selection refers to, for example, a situation where the customer or operator associates specific color conversion settings with attribute 304 that is evaluated in addition to the selected media. For example, one may specify a "print condition" value that is used to select between multiple TRCs or ICC profiles for a given media. Unlike the TRC or ICC profile selection, the print condition values may be reused with multiple media to select high quality or economy printing operations.

Figure 9:
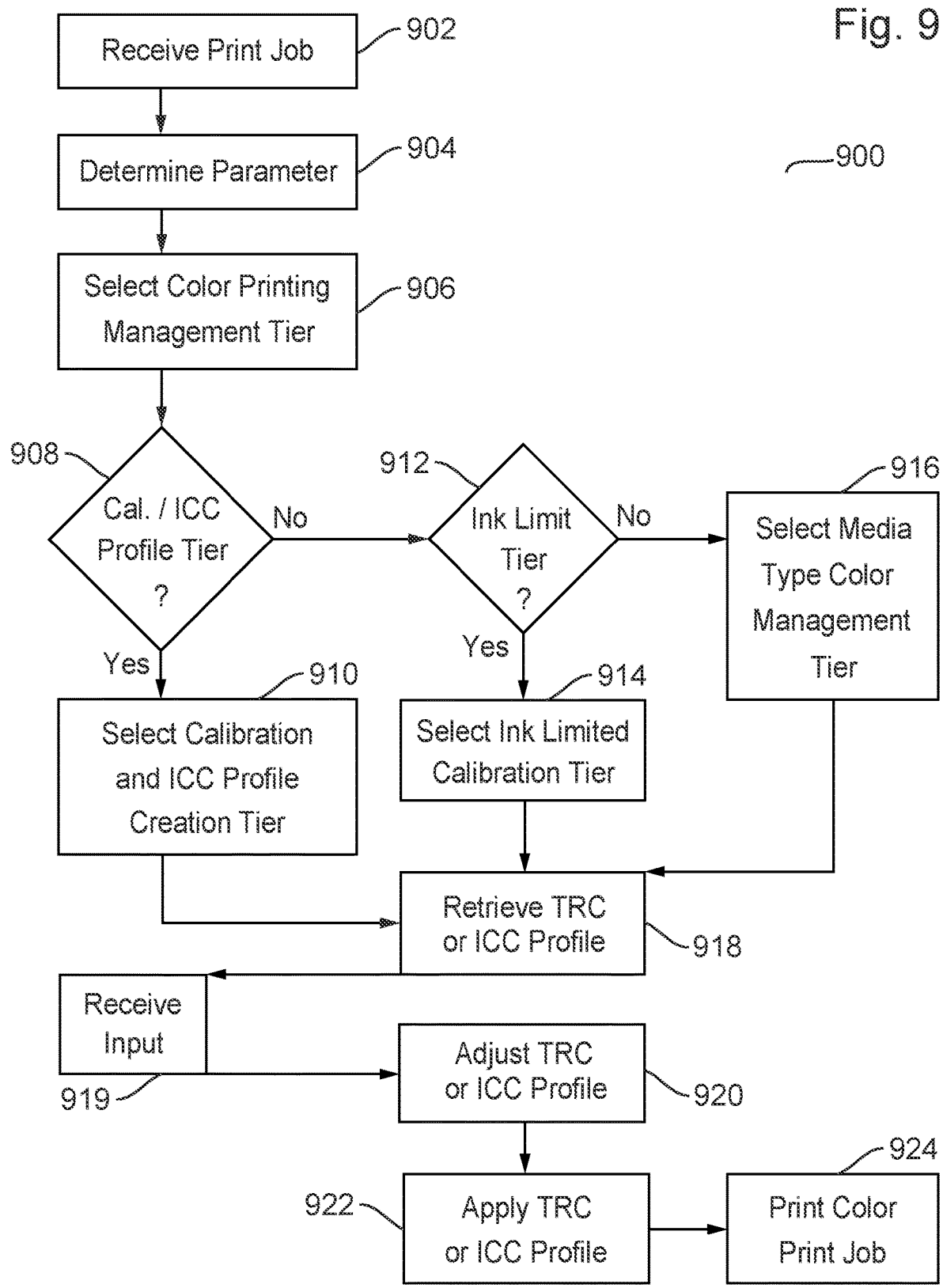
FIG. 9 illustrates a flowchart for managing color printing operations using management tiers according to the disclosed embodiments.

FIG. 9 depicts a flowchart 900 for managing color printing operations using management tiers according to the disclosed embodiments. Flowchart 900 may refer to elements of FIGS. 1-8 for illustrative purposes. Flowchart 900, however, is not limited to the embodiments disclosed by FIGS. 1-8.

Step 902 executes by receiving color print job 302 at printing device 104. Alternatively, color print job 302 may be received by color management server 106. Step 904 executes by determining parameter 303 for print job 302. Parameter 303 is defined above. It may be an attribute 304 for color conversion, such as a setting, or media type 306 for the paper being used by print job 302. Media type 306 may be used to identify calibrated paper 308 having media type 310, which is the same as media type 306.

Step 906 executes by selecting a color printing management tier according to parameter 303. For example, if parameter 303 is an attribute 304 for color conversion, such as an end point target, then media type color management tier 312 may be selected. If attribute 304 is an ink limit, then ink limited calibration tier 314 may be selected. If attribute 304 is a gray component replacement, then calibration and ICC profile creation tier may be selected. Further, a tier may be assigned for a specific media type. Thus, parameter 303 may be media type 306.

Step 908 executes by determining whether calibration and ICC profile creation tier 316 is selected. If yes, then step 910 executes by selecting calibration and ICC profile creation tier 316 to manage color printing conversion for print job 302. Tier 316 and its functionality are disclosed above.

If step 908 is no, then step 912 executes by determining whether ink limited calibration tier 314 is selected. If yes, then step 914 executes by selecting ink limited calibration tier 314 to manage color printing conversion for print job 302. Tier 314 and its functionality are disclosed above.

If step 912 is no, then step 916 executes by selecting media type color management tier 312 to manage color printing conversion for print job 302. Tier 312 and its functionality are disclosed above. If no tier is selected, then the disclosed embodiments select tier 312 as the default tier. For example, parameter 303 may not be conclusive or even attached to print job 302. The disclosed embodiment will select tier 312 as the color management tier.

Step 918 executes by retrieving a TRC 156 or ICC profile 157 according to the selected color printing management tier for print job 302. There may be multiple TRCs or ICC profiles for a given media. Parameter 303 may specify which tier to use, which, in turn determines which TRC or ICC profile to retrieve. Different TRCs or ICC profiles may relate to different tiers, which may impact the quality of color printing.

Step 919 executes by receiving input 318. Input 318 may be an edit to a setting for one of the color printing resources, depending on which tier was selected. Input 318 may be included in parameter 303. Step 920 executes by adjusting TRC 156 or ICC profile 157 using input 318. The different processes for adjusting color conversion resources using different types of inputs are disclosed above.

Step 922 executes by applying the adjusted or updated TRC or ICC profile to process print job 302 at printing device 104. Color conversion is done using the update values in the TRC or the ICC profile. Step 924 executes by printing color print job 302 at printing device 104.

In some embodiments, the metadata associated with media 310 of calibrated paper 308 will determine which color printing management tier to select, instead of parameter 303 of print job 302. This feature allows for the color printing management tier to be determined as early as possible at printing device 104 and within system 100 so that color management operations may be performed before a print job is received at printing device 104. For example, calibration paper 308 of media 310 may be assigned a color printing management tier that allows adjustment to the TRCs or ICC profiles, as disclosed above, but without the need for a print job with parameters.

Figure 10:
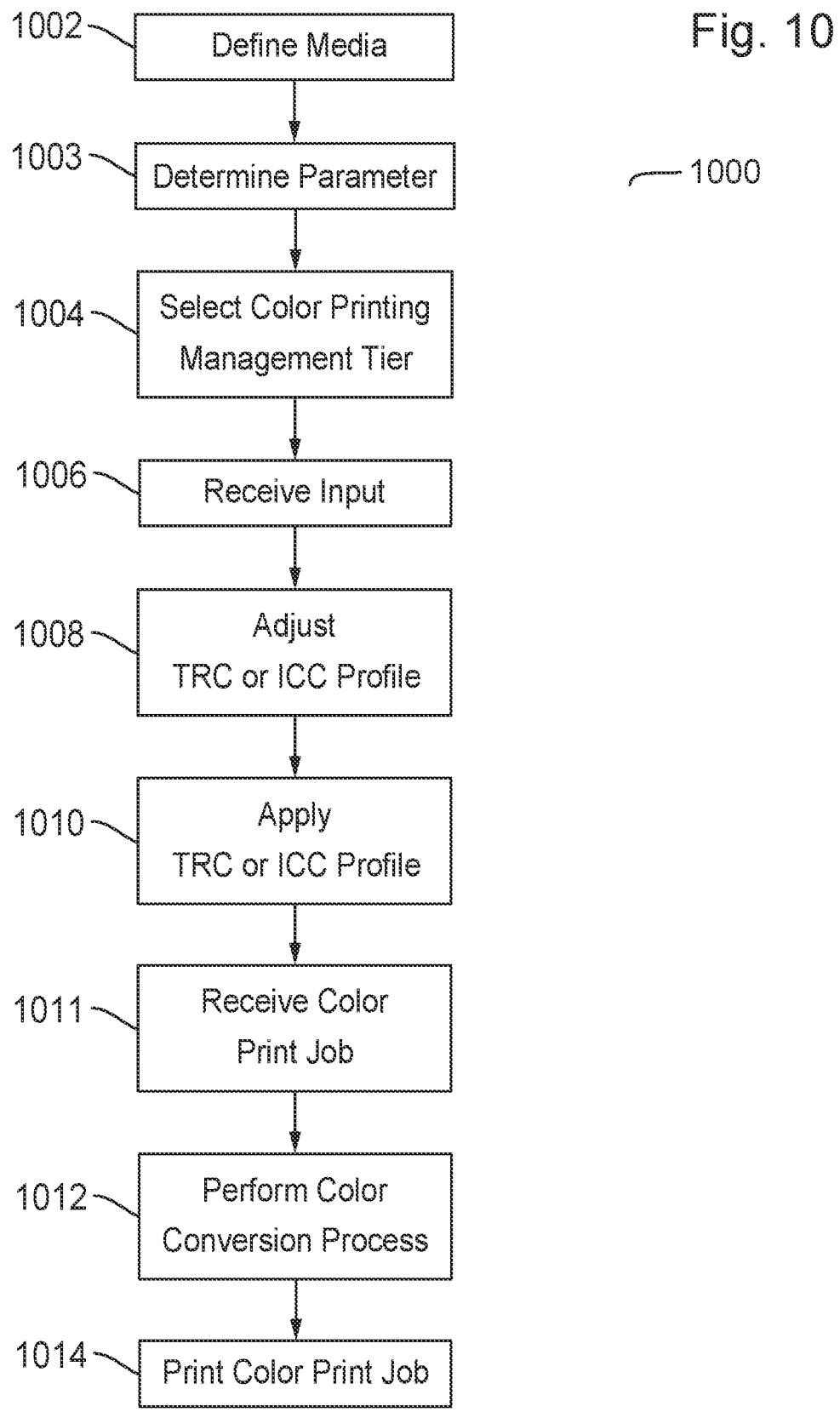
FIG. 10 illustrates a flowchart for managing color printing operations at a printing device using the metadata associated with the media for a calibrated paper according to the disclosed embodiments.

FIG. 10 depicts a flowchart 1000 for managing color printing operations at printing device 104 using the metadata associated with media 310 for calibrated paper 308 according to the disclosed embodiments. Flowchart 1000 may refer to elements of FIGS. 1-9 for illustrative purposes. Flowchart 1000, however, is not limited to the embodiments disclosed by FIGS. 1-9.

Step 1002 executes by defining media 310 for calibrated paper 308 that is loaded onto printing device 104. Media 310 may include metadata associated with the type of calibrated paper 308 being used. The metadata may include one or more parameters 330 associated with media 310. Parameters 330 may include attribute 332 and type of media 334. Attribute 332 may corresponds to attribute 304, disclosed above. For example, a TRC setting or ink limit may be associated with media 310. Attribute 304 is set when calibrated paper 308 is loaded onto printing device 104, if not before. Type of media 334 may be the type of media being used for calibrated paper 308, similar to media type 306 disclosed above. Again, certain types of media may only use a certain color printing management tier.

As disclosed above, parameter 330 may be within the metadata associated with media 310. An operator may enter this information at printing device 104 or via color management server 106. Alternatively, the information for the metadata may be stored within system 100, such as at color management server 106 for retrieval when printing device 104 acknowledges that calibrated paper 308 is loaded onto the printing device. These features allow for dynamic management of color printing operations within system 100. TRCs and ICC profiles also may be defined by the metadata.

Step 1003 executes by determining parameter 330 from the metadata associated with media 310. Step 1003 may correspond to step 904 disclosed above, except it is found within the metadata for media 310. Step 1004 executes by selecting a color printing management tier for printing operations of calibrated paper 308. Step 1004 may correspond to steps 906-918 disclosed above. In some embodiments, the TRC or ICC profile is not retrieved until after step 1006, disclosed below.

Step 1006 executes by receiving an input based on the selected color printing management tier. Step 1006 may correspond to step 919 disclosed above. The input may specify to which calibrated paper 308 it pertains. Again, no print job may have been received yet at printing device 104 that uses media 310 of calibrated paper 308. The operator may wish to manage color printing operations before any print job is received.

Step 1008 executes by adjusting TRC or ICC profile. Step 1008 may correspond to step 920 disclosed above. Step 1010 executes by applying the adjusted TRC or ICC profile to a subsequent print job using calibrated paper 308 of media 310. Step 1011 executes by receiving a color print job, such as print job 302, at printing device 104. Print job 302 may not include parameter 303, as disclosed above. If print job 302 does include parameter 303, then the processes disclosed above with regard to FIG. 9 may be executed to further adjust the TRC or ICC profile being used for color printing operations.

Step 1012 executes by performing a color conversion process for print job 302 to reproduce the colors for printing on calibrated paper 308. The color conversion process uses the corresponding TRC or ICC profile, as disclosed above. Step 1014 executes by printing color print job 302 at printing device 104 on calibrated paper 308. When a document is printed, the disclosed embodiments will look at the selected media of calibrated paper 308 and determine which color management tier should be applied to the print job. In some embodiments, the selected tier may be either ink limited calibration tier 314 or calibration and ICC profile creation tier 316, but not both. If neither tier 314 nor tier 316 is specified, then the disclosed embodiments may default to media type color management tier 312.

In some embodiments, the disclosed embodiments also may allow multiple TRCs or ICC profiles be defined for a given media. The operator may have the option to specify which TRC or ICC profile to use based on either direct selection or based on indirect selection. Direct selection relates to the operator directly selecting which TRC or ICC profile to apply.

Indirect selection may be defined, for example, as the instance that the operator associates specific color conversion settings with a parameter or attribute that is evaluated in addition to the selected media. For the example, the operator may specify a "print condition" value that is used to select between multiple TRCs or ICC profiles for a given media. Unlike the TRC or ICC profile selection, the print condition values may be reused with multiple media to select, for example, high quality versus economy printing. An example print condition value may indicate a quality level from the received print job. In other embodiments, it may relate to the amount being charged to print the document. Certain prices may invoke different TRCs or ICC profiles for a selected media. The prices may apply to all print media.

Figure 11:
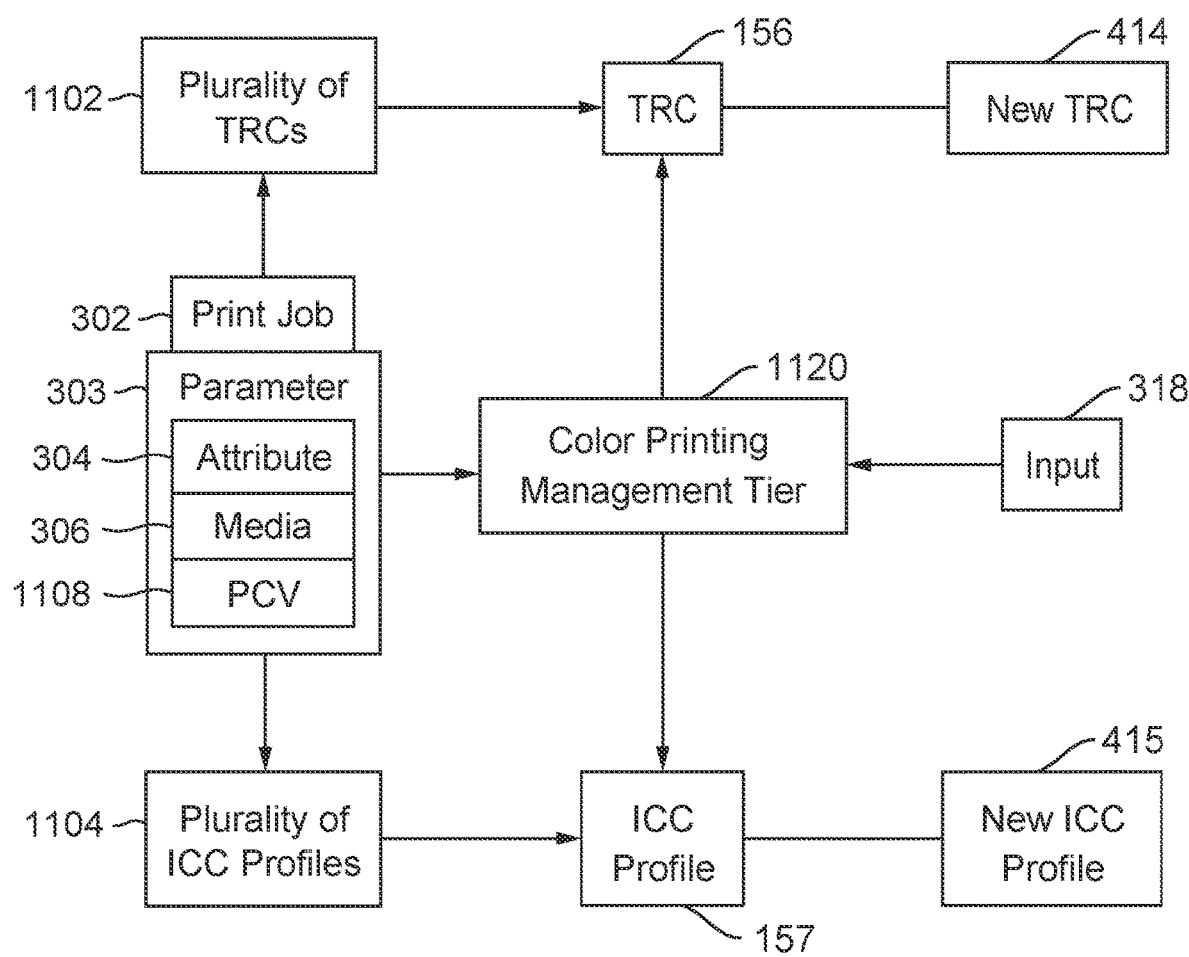
FIG. 11 illustrates a block diagram for managing a TRC of a plurality of TRCs or an ICC profile of a plurality of ICC profiles according to the disclosed embodiments.

FIG. 11 depicts a block diagram for managing a TRC 156 of a plurality of TRCs 1102 or an ICC profile 157 of a plurality of ICC profiles 1104 according to the disclosed embodiments. As disclosed above, printing device 104 may implement multiple TRCs or ICC profiles for a given media 310 of calibrated paper 308. When a print job is received, one of the plurality of TRCs or ICC profiles for that media may be used for color conversion processes to process a print job. This features allows different levels of color printing for a media, as opposed to a single TRC or ICC profile for the media.

Print job 302 is received at printing device 104. Print job 302 is disclosed above and may include parameter 303. Parameter 303 may include one or more attributes 304 and media type 306. Parameter 303 also may include print condition value 1108. Parameter 303 is used to select the appropriate TRC from plurality of TRCs 1102 or the appropriate ICC profile from plurality of ICC profiles 1104. Parameter 303 also may be used to select color printing management tier 1120 to use in managing color printing operations, as disclosed above. The process for selecting color printing management tier 1120 is not repeated here. The disclosed embodiments may use the processes disclosed above to select media type color management tier 312, ink limited calibration tier 314, or calibration and ICC profile creation tier 316 as color printing management tier 1120.

Parameter 303 is used by the disclosed embodiments to select TRC 156 of plurality of TRCs 1102. Media type 306 for print job 302 may related to several of the plurality of TRCs 1102. Attribute 304 or print condition value 1108 is used to select TRC 156. These items may relate to a quality level for print job 302 such that TRC 157 provides the specified quality for the color printing. Parameter 303 also may be used by the disclosed embodiments to select ICC profile 157 of plurality of ICC profiles 1104 in a similar manner.

As disclosed above, input 318 may be received at printing device 104 to adjust TRC 156 or ICC profile 157. Color printing management tier 1120 for print job 302 may perform any adjustments, as disclosed above, depending on which color printing management tier is selected. Using input 318, new TRC 414 is generated or new ICC profile 415 is generated, as disclosed above. The updated TRC or the updated ICC profile then may be applied to the color conversion process to print color print job 302.

FIG. 12 depicts a flowchart 1200 for selecting TRC 156 from a plurality of TRCs 1102 according to the disclosed embodiments. Flowchart 1200 may refer to elements of FIGS. 1-11 for illustrative purposes. Flowchart 1200, however, is not limited to the embodiments disclosed by FIGS. 1-11.

Step 1202 executes by accessing a plurality of TRCs 1102 at printing device 104. Plurality of TRCs 1102 may be located in DFE 132 of printing device 104. Step 1204 executes by defining a plurality of TRCs 1102 to be used in color printing for a media type 306 or media 310 of calibrated paper 308. As disclosed above, there may be more than one TRC for color printing operations for calibrated paper 308. The different TRCs may correspond to different printing criteria used in color printing documents on calibrated paper 308.

Step 1206 executes by receiving color print job 302 at printing device 104. Color print job 302 may include a parameter 303, as disclosed above. Color print job 302 includes media type 306 that corresponds to media 310 of calibrated paper 308. Step 1208 executes by determining parameter 303 of print job 302. Parameter 303 may include an attribute 304 or print condition value 1108, as disclosed above.

Step 1210 executes by selecting TRC 156 from plurality of TRCs 1102 based on parameter 303. In some embodiments, print condition value 1108 determines which TRC to select. It should be noted that print condition value 1108 may be used across different media 310 for different calibrated papers 308 loaded onto printing device 104. Flowchart 1200 also may execute step 1212 by selecting color printing management tier 1120, as disclosed above with relation to color printing management tiers 312, 314, and 316. Color printing management tier 1120 is used to manage TRC 156 for media 310.

Step 1214 executes by receiving input 318, which corresponds to step 919 disclosed above. Steps 1210 and 1214 then proceed to step 1216 which executes by adjusting TRC 156 based on input 318. Step 1216 corresponds to step 920 disclosed above. A new TRC 414 may be generated as a result of the adjustment. Step 1218 executes by applying TRC 156 to perform a color conversion process for print job 302. Step 1218 corresponds to step 922 disclosed above. Step 1220 executes by printing color print job 302 at printing device 104 on calibrated paper 308 of media 310.

In some embodiments, steps 1212, 1214, and 1216 are not executed such that selected TRC 156 is applied to perform the color conversion process to print the document for print job 302. Further, if another print job 302 is received with a different parameter 303, then a different TRC may be applied to perform the color conversion process using the settings of the respective TRC. Thus, different TRCs may be used in color printing operations for calibrated paper 308.

FIG. 13 depicts a flowchart 1300 for selecting ICC profile 157 from a plurality of ICC profiles 1104 according to the disclosed embodiments. Flowchart 1300 may refer to elements of FIGS. 1-12 for illustrative purposes. Flowchart 1300, however, is not limited to the embodiments disclosed by FIGS. 1-12.

Step 1302 executes by accessing a plurality of TRCs 1104 at printing device 104. Plurality of ICC profiles 1104 may be located in DFE 132 of printing device 104. Step 1304 executes by defining a plurality of ICC profiles 1104 to be used in color printing for a media type 306 or media 310 of calibrated paper 308. As disclosed above, there may be more than one ICC profile for color printing operations for calibrated paper 308. The different ICC profiles may correspond to different printing criteria used in color printing documents on calibrated paper 308.

Step 1306 executes by receiving color print job 302 at printing device 104. Color print job 302 may include a parameter 303, as disclosed above. Color print job 302 includes media type 306 that corresponds to media 310 of calibrated paper 308. Step 1308 executes by determining parameter 303 of print job 302. Parameter 303 may include an attribute 304 or print condition value 1108, as disclosed above.

Step 1310 executes by selecting ICC profile 157 from plurality of ICC profiles 157 based on parameter 303. In some embodiments, print condition value 1108 determines which ICC profile to select. It should be noted that print condition value 1108 may be used across different media 310 for different calibrated papers 308 loaded onto printing device 104. Flowchart 1300 also may execute step 1312 by selecting color printing management tier 1120, as disclosed above with relation to color printing management tiers 312, 314, and 316. Color printing management tier 1120 is used to manage ICC profile 157 for media 310.

Step 1314 executes by receiving input 318, which corresponds to step 919 disclosed above. Steps 1310 and 1314 then proceed to step 1316 which executes by adjusting ICC profile 157 based on input 318. Step 1316 corresponds to step 920 disclosed above. A new ICC profile 415 may be generated as a result of the adjustment. Step 1318 executes by using ICC profile 157 to perform a color conversion process for print job 302. Step 1318 corresponds to step 922 disclosed above. Step 1320 executes by printing color print job 302 at printing device 104 on calibrated paper 308 of media 310.

In some embodiments, steps 1312, 1314, and 1316 are not executed such that selected ICC profile 157 is applied to perform the color conversion process to print the document for print job 302. Further, if another print job 302 is received with a different parameter 303, then a different ICC profile may be used to perform the color conversion process using the settings of the respective ICC profile. Thus, different ICC profiles may be used in color printing operations for calibrated paper 308.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color printing operations, the method comprising:
defining a print media for a printing device, wherein the print media is associated with metadata;
selecting a color printing management tier from a plurality of color printing management tiers according to the metadata, wherein the plurality of color printing management tiers includes a media type color management tier, an ink limited calibration management tier, and a calibration and ICC profile creation management tier;
defaulting to the media type color management tier if no tier is selected;
adjusting a tone reproduction curve (TRC) or an ICC profile according to the selected color printing management tier;
applying the TRC or the ICC profile to process a color print job at the printing device; and
printing the color print job at the printing device.

2. The method of claim 1, further comprising receiving an input based on the color management tier.

3. The method of claim 2, wherein adjusting the TRC or the ICC profile includes using the input.

4. The method of claim 1, wherein selecting the color printing management tier includes selecting the media type color management tier.

5. The method of claim 4, further comprising identifying the TRC or the ICC profile according to the color print job.

6. The method of claim 5, wherein adjusting the TRC or the ICC profile includes editing a TRC setting.

7. The method of claim 1, wherein selecting the color printing management tier includes selecting the ink limited calibration management tier.

8. The method of claim 7, wherein adjusting the TRC or the ICC profile includes applying an ink limit defined for the print media.

9. The method of claim 8, further comprising using the ink limit during the applying step to control total ink use for the color print job using the print media.

10. The method of claim 1, wherein selecting the color printing management tier includes selecting the calibration and ICC profile creation tier.

11. A method for managing color printing operations, the method comprising:
defining a plurality of tone reproduction curves (TRCs) for a print media at a printing device;
receiving a color print job of a document having a parameter, wherein the color print job uses the print media;
selecting a TRC from the plurality of TRCs based on the parameter;
selecting a color printing management tier associated with the print media from a plurality of color printing management tiers according to the parameter, wherein the plurality of color printing management tiers includes a media type color management tier, an ink limited calibration management tier, and a calibration and ICC profile creation management tier;
defaulting to the media type color management tier if no tier is selected;
editing the TRC according to the selected color printing management tier;
applying the TRC to perform a color conversion process for the color print job; and
printing the document on the print media at the printing device.

12. The method of claim 11, wherein the parameter includes a print condition value to select the TRC from the plurality of TRCs.

13. The method of claim 11, wherein editing the TRC includes editing a TRC setting.

14. A method for managing color printing operations, the method comprising:
- defining a plurality of ICC profiles for color conversion to color print on a print media at a printing device;
- receiving a color print job of a document having a parameter, wherein the color print job uses the print media;
- selecting an ICC profile from the plurality of ICC profiles based on the parameter;
- selecting a color printing management tier associated with the print media from a plurality of color printing management tiers according to the parameter, wherein the plurality of color printing management tiers includes a media type color management tier, an ink limited calibration management tier, and a calibration and ICC profile creation management tier;
- defaulting to the media type color management tier if no tier is selected;
- editing the ICC profile according to the color printing management tier;
- using the ICC profile to perform a color conversion process for the color print job; and
- printing the document on the print media at the printing device.

15. The method of claim 14, wherein the parameter includes a print condition value to select the ICC profile from the plurality of ICC profiles.

\* \* \* \* \*